May 18, 1954 R. F. ALBRIGHTON 2,679,034

CODE INTEGRITY CHECK FOR CENTRALIZED TRAFFIC CONTROL SYSTEMS

Filed Feb. 26, 1952 4 Sheets-Sheet 1

INVENTOR.

R. F. Albrighton

BY Neil A. Preston,

His. ATTORNEY

May 18, 1954 R. F. ALBRIGHTON 2,679,034

CODE INTEGRITY CHECK FOR CENTRALIZED TRAFFIC CONTROL SYSTEMS

Filed Feb. 26, 1952 4 Sheets-Sheet 2

INVENTOR.
R.F. Albrighton
BY Neil L. Preston,
His ATTORNEY

INVENTOR.
R. F. Albrighton
BY Neil W. Preston,
His ATTORNEY

CONTROL OFFICE TRANSMISSION

FIELD STATION RECEPTION

SOLID BAR REPRESENTS ENERGIZATION
COMMUNICATION OF SWITCH CYCLE CODE
"MARK-MARK-MARK-MARK-SPACE-SPACE-MARK"

INVENTOR.
R.F.Albrighton
BY Neil W. Preston,
His ATTORNEY

Patented May 18, 1954 2,679,034

UNITED STATES PATENT OFFICE 2,679,034

CODE INTEGRITY CHECK FOR CENTRALIZED TRAFFIC CONTROL SYSTEMS

Reginald F. Albrighton, Rochester, N. Y., assignor to General Railway Signal Company, Rochester, N. Y.

Application February 26, 1952, Serial No. 273,373

7 Claims. (Cl. 340—163)

This invention relates to the checking of the integrity of codes in a code communication system of the type used in centralized traffic control systems for railroads, and it more particularly relates to means for preventing the execution of a switch and/or signal control code transmitted from a control office to a field station, upon reception at the field station, in case of a failure of a transmitted code to check with the code that has been designated to be transmitted.

The present invention is of utility in a code communication system such, for example, as that disclosed in the prior application of N. B. Coley, Ser. No. 240,086, filed August 3, 1951, which has resulted in Patent No. 2,626,314, dated January 20, 1953. In this system the transmission of codes is by "marks" and "spaces," a mark being a period of energization of a line circuit, or a period of modulation for carrier or space radiation transmission, and a space being a period of deenergization or no modulation, as the case may be. Thus the transmission of the code from the control office is by the pulsing of a transmitter relay, which, when actuated to one position, closes the line circuit for the transmission of a mark, and when actuated to the other position, opens the line circuit for a space character.

Generally speaking, and without attempting to define the scope of the present invention, the present invention provides a check relay for insuring the integrity of mark and space character transmission. The check relay is required to be maintained energized at the control office, dependent upon a continuity check through the code selecting circuits during the respective steps. Should there be a failure of continuity, the check relay would be actuated, and its actuation would so affect the termination of the cycle of operation of the code communication system as to forestall execution of the code received at a field station during the cycle of operation.

An object of the present invention is to distinctively characterize the code transmitted during a cycle of operation of a code communication system to prevent the execution of the code as received in case the code transmitted does not correspond to a predetermined code that has been designated for transmission.

Another object of the present invention is to require a check relay at a transmitting station to be maintained picked up throughout the transmission of a control code in order to transmit a distinctive final character permitting execution of the code when received at a field station, the energization of the check relay being dependent during the respective steps upon the continuity of code character selecting circuits during the respective steps selecting either mark or space characters.

Other objects, purposes, and characteristic features of the present invention, will be in part obvious from the accompanying drawings, and in part pointed out as the description of the invention progresses.

In describing the invention in detail, reference is made to the accompanying drawings, in which corresponding parts are designated by like reference characters; in which similar parts having similar functions are designated by like letter reference characters generally having preceding numerals indicative of the order of the relay operation and succeeding numerals indicative of designation of a distinctive location or station with which the apparatus is associated, and in which:

Figs. 1A and 1B when placed end to end illustrate schematically the system organization of one embodiment of the present invention wherein the organization as illustrated in Fig. 1A is of apparatus located at the control office, and wherein the part of the system illustrated in Fig. 1B is at a field location;

Figure 1A:
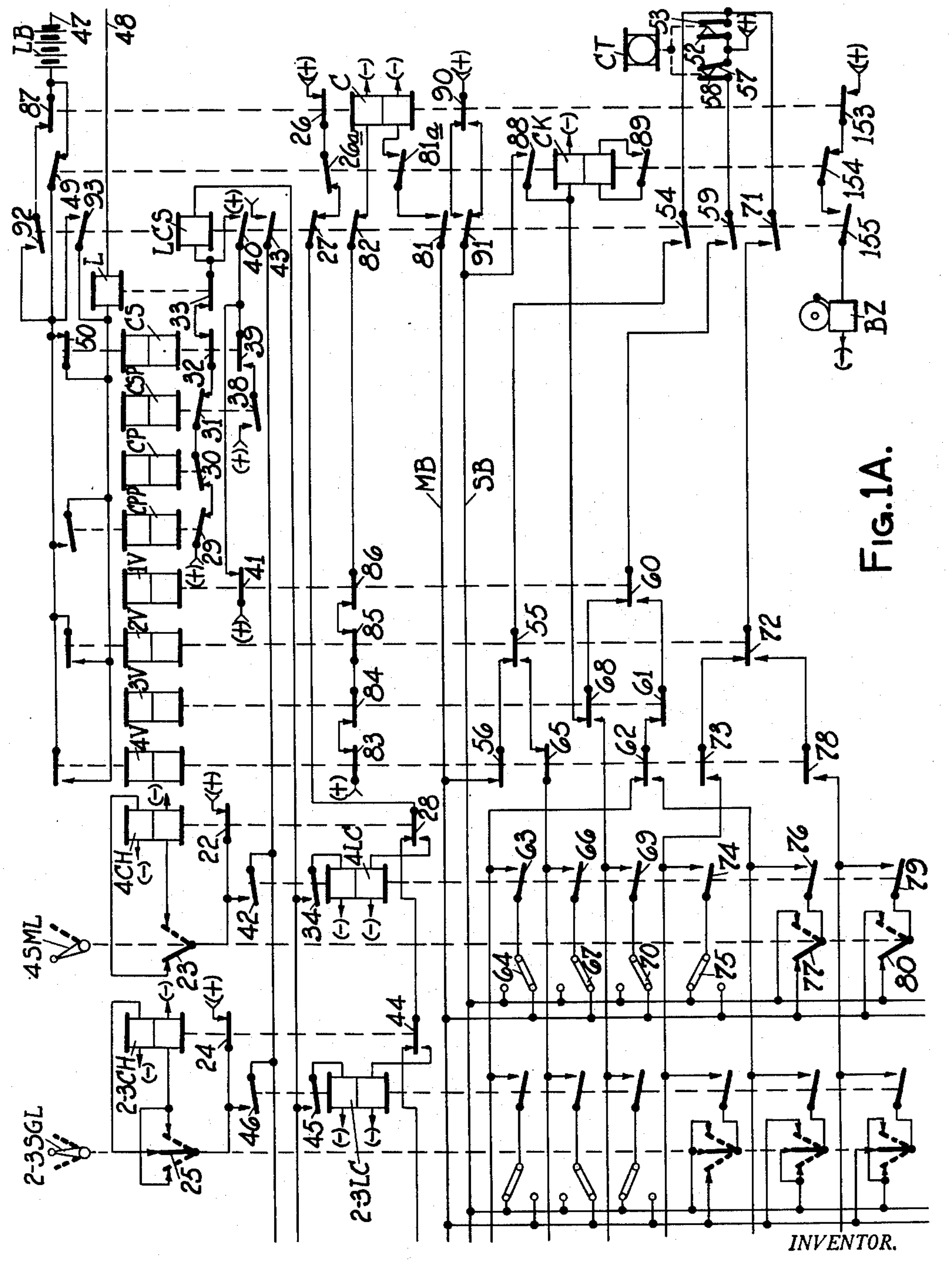

Conventional schematic diagrams have been used for the disclosure of the system organization in the drawings, such drawings being prepared more particularly to facilitate an understanding of the mode of operation of the system, rather than to attempt to point out all of the necessary details of construction and specific arrangement of components that may be provided by those skilled in the art in accordance with the requirements of practice. The symbols (+) and (—) have been used to indicate connections to the respective positive and negative terminals of suitable batteries or other sources of direct current.

Figure 1B:
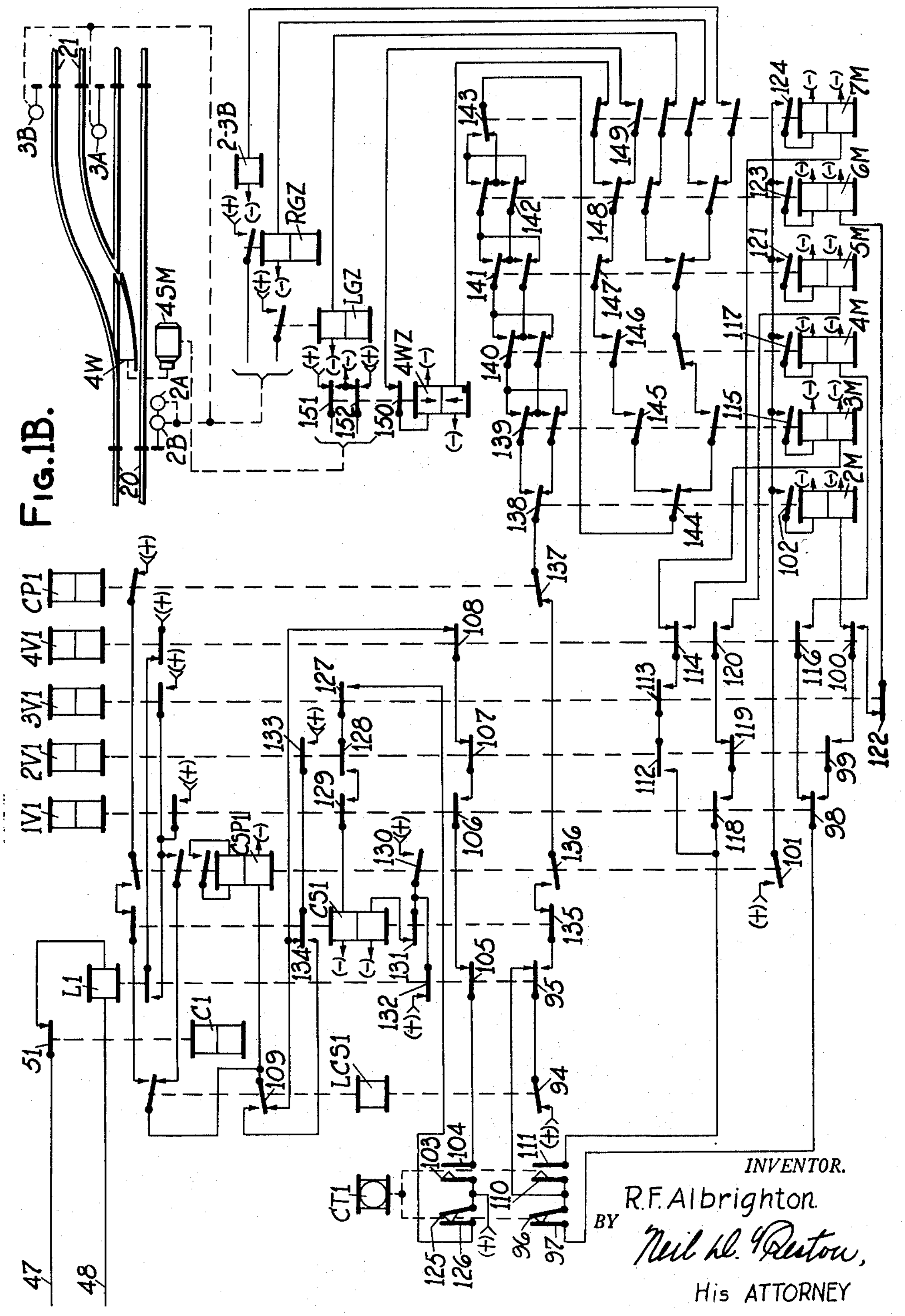

Although it is to be understood that the present invention is readily adaptable for the communication of switch and signal controls from a control office to a remote field station for a track layout having a relatively large number of track switches and signals to be controlled, for the purpose of simplification of this embodiment of the present invention, it has been considered sufficient for an understanding of the present invention that it be applied only for the control of a single track switch and signals governing traffic thereover, which may be considered, for example, as a small part of a larger railway interlocking system, other track switches and signals being governed by respective controls transmitted from the control office in a similar manner from that which will be hereinafter specifically considered for the control of the single track switch and signals that are illustrated in Fig. 1B. According to Fig. 1B, a main stretch of track 20 is illustrative as having a second track 21 connected thereto by a track switch 4W which is operated by a power switch machine 4SM. Eastbound traffic over the track switch 4W is governed by signals 2A and 2B, while westbound traffic over the track switch 4W is governed by the signals 3A and 3B.

It is to be understood that the system includes a suitable control machine at the control office, such as is well known in the art, for governing traffic through the track layout. This machine has a suitable control panel (not shown) having a track diagram constructed thereon with suitable indicator lamps (not shown) being disposed along the trackway of the diagram for indicating the conditions of occupancy of the respective track sections within the controlled territory. Indicator lamps (not shown) are also provided on the control panel in accordance with the requirements of practice for indicating the positions of track switches, the locked conditions of the track switches, and the conditions of the signals governing traffic through the track layout for which the control machine is provided. Also disposed on the control panel, either directly on the track diagram, or below the track diagram, in accordance with the requirements of practice, are suitable levers or buttons for designation of the entrance and exit ends of routes to be established, or for designation of the positions of the track switches and signals to be controlled. Thus, for example, with reference to Fig. 1A, a switch control lever 4SML is provided for the control of the track switch 4W (see Fig. 1B), and the signal control lever 2-3SGL is provided for controlling the clearing of the signals governing traffic through the track switch 4W. The lever 4SML is a two-position lever, the left-hand position as shown in Fig. 1A being used for governing the power operation of the track switch 4W to its normal position, and the right-hand position of the lever 4SML being used for governing the power operation of the track switch 4W to its reverse position. The signal control lever 2-3SGL is a three-position lever wherein its center position is used for putting the associated signals to stop, its left-hand position is used for governing the clearing of a signal for governing westbound traffic, and its right-hand position is used for governing the clearing of a signal for governing eastbound traffic. It is to be understood that these switch and signal control levers may be replaced by other types of manually operable switches, or by relays, or by buttons or any other suitable means that may be desired to be employed in practice for the designation of the controls that are to be transmitted for the control of respective track switches and signals.

Figure 2:
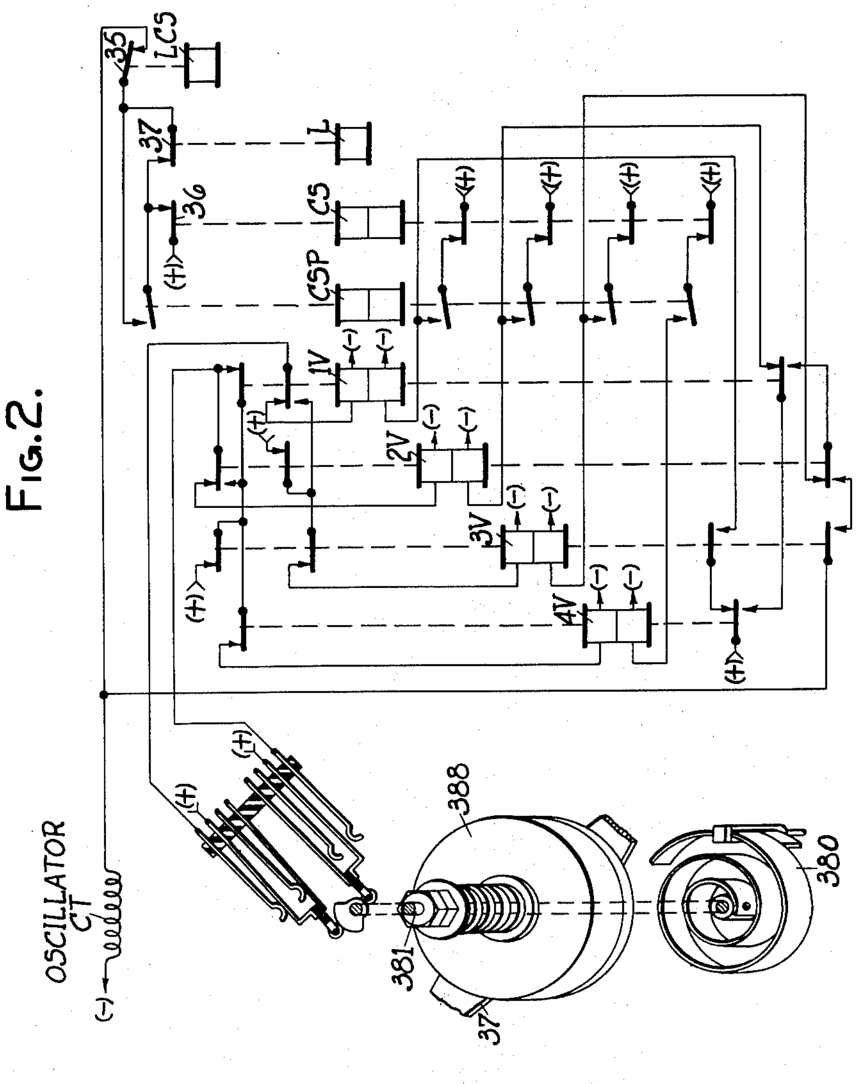
Fig. 2 is a schematic diagram illustrating the organization for the operation of a typical stepping relay bank that can be used in connection with the present invention.

Although different types of timing devices may be used for governing the rate of operation of the stepping, the timing device employed in this embodiment of the present invention is illustrated in Fig. 2 as being of the torsional pendulum, or balance wheel type of the general character disclosed in the patent to O. S. Field, No. 2,351,588, dated June 20, 1944. This oscillator, according to the Field patent, is adapted to be driven at a constant rate and to be energized for a limited period of each of its operating cycles so as to maintain its oscillations continuously at a uniform rate as long as energy is applied to the device. For the purpose of driving the stepper used in this embodiment of the present invention, however, it is considered more desirable that the oscillator mechanism be normally inactive but retained in a predetermined one of its extreme rotated positions so that it can be started from a predetermined contacting position when it is desired to initiate the stepping operation at the associated station. Therefore the oscillator according to the Field patent is preferably modified to provide that its winding is normally energized as is illustrated in Fig. 2 when the system is at rest, and upon setting the code communication system into operation, energy is removed from the electromagnet of the associated oscillator CT and the torsional pendulum, or balance wheel, is permitted to oscillate freely, the amplitude and periodicity of which is determined by the inertia of the balance wheel in combination with the characteristics of an involute spring such as the spring illustrated in Fig. 2.

For the purpose of simplification of the disclosure of the present invention, certain parts of the system which can be provided comparable to corresponding identified parts in the above mentioned Coley application have not been shown in detail, as reference can be made to this Coley application for a detailed consideration of these parts. Thus, at the control office, the stepping relays 1V, 2V, 3V, and 4V, the cycle start relays CS and CSP, and the cycle repeat relays CP and CPP (see Fig. 1A) have their windings shown only in block form, and it is to be understood that these relays can be controlled by circuit organizations disclosed for similarly designated relays in the above mentioned Coley application.

Similarly at the field station (see Fig. 1B) the stepping relays 1V1, 2V1, 3V1, and 4V1, the cycle start relays CS1, CSP1, and LCS1, and the indication code transmitter relay C1 are shown only in block form as it is to be understood that circuits for their control can be provided as disclosed for similarly identified relays in the above mentioned application of N. B. Coley.

A cycle start relay CH and an associated relay LC is provided at the control office for each of the various control levers on the control machine as a means for respectively starting a control cycle of operation of the code communication system, and determining the code for transmission during a cycle of operation. The various relays LC are interlocked by the use of a relay LCS so that only one relay LC can be picked up at one time to prevent interference with the transmission of a selected code, once transmission has been initiated.

A code transmitter relay C is provided at the control office for pulsing a normally energized line circuit which connects the control office and the field station, the line circuit having a line relay L at the control office and a line relay L1 at the field station.

The checking of the integrity of code transmission at the control office is accomplished by a check relay CK which is required to be maintained energized by its respective stick circuits throughout each control cycle in order to permit the transmission of a code which may be executed when received at a field station. The sustained energization of the check relay CK during transmission, dependent upon continuity in the respective code character selecting circuits, will be more readily understood as the description progresses and the specific mode of operation of the system is considered.

In accordance with the reception of control codes at the field station illustrated in Fig. 1B, message relays 2M, 3M, 4M, 5M, 6M, and 7M are selectively energized in accordance with the reception of a mark during the steps corresponding to the preceding numerals of these reference characters.

A magnetic stick switch control relay 4WZ is provided at the field station for governing the power operation of the track switch 4W, left and right neutral signal control relays LGZ and RGZ are provided for governing the clearing of signals for the respective opposite directions of traffic through the track switch 4W, and the relay 2–3B is provided for restoring a signal to stop in accordance with the reception of a signal stop code. The stick circuits for the relays LGZ and RGZ which are usually provided for causing stick operation of the signals are not shown, but they can be provided according to the requirements of practice.

Having thus considered the general organization of the apparatus in a code communication system for one embodiment of the present invention, the circuit organization will be hereinafter more specifically described when considering the mode of operation of the system during typical operating conditions.

*Operation*

Before considering specifically the circuit organization and mode of operation under typical operating conditions, it is believed expedient to consider the mode of operation in general, without specific reference to the circuits involved in such operation.

If it is desired to transmit a control from the control office to the field station for setting up a route, the operator of the control machine first actuates all of the switch control levers required for obtaining the proper positions of the track switches to set up a route, and then he actuates the signal control lever SGL (see Fig. 1A) for the signal governing entrance to the route. In accordance with the actuation of these respective levers, an associated relay CH is dropped away, and the dropping away of this relay is effective to cause the picking up of the associated relay LC, and the relay LCS. The picking up of the relay LCS prevents the picking up of other relays LC during the control cycle, and it also deenergizes the oscillator CT, and thus sets the oscillator into operation to actuate the stepping relays and selectively govern the energization of the code transmitting relay C for the transmission of a control code.

Figure 3:
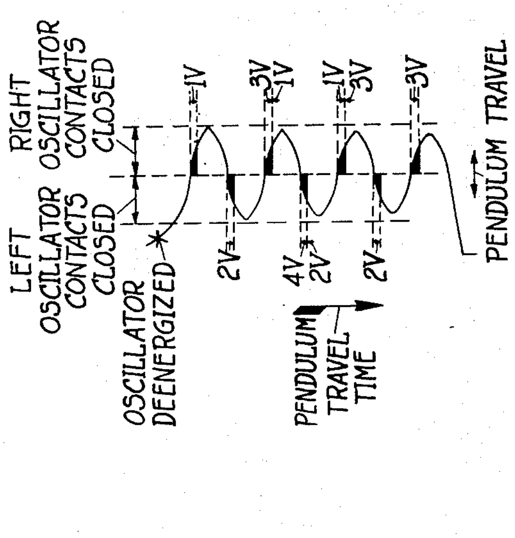
Fig. 3 is a sequence diagram illustrating the times of operation of the respective stepping relays as measured by their associated oscillatory timing device.

With reference to the diagram of Fig. 3, when the torsional pendulum 388 of the oscillator CT first rotates through its center position, the opening of one set of contacts of the oscillator CT is effective to denergize the first of the stepping relays 1V, and similarly for each of the subsequent rotations of the pendulum 388 in the same direction through the center position, an odd numbered stepping relay V is dropped away. Upon the rotation of the pendulum 388 through center in the opposite direction to complete the first excursion of the pendulum 388 with respect to its locked up position, the second step is taken by the dropping away of the relay 2V, and on subsequent similar operations of the oscillator pendulum 388 in the same direction through center, an even numbered step is taken by the dropping away of an even numbered stepping relay V.

Figure 4A:
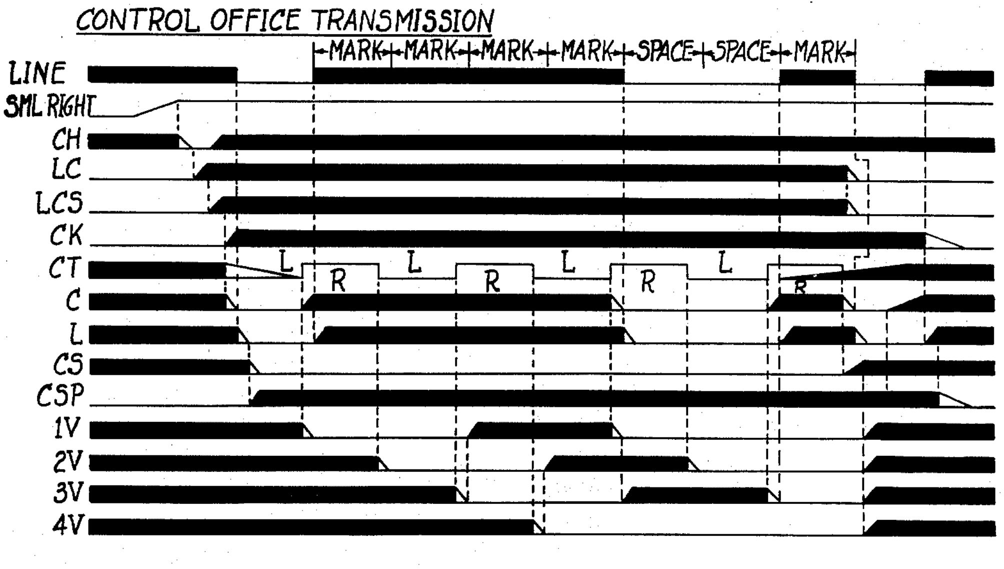
Figs. 4A and 4B are diagrams illustrating particularly the normal sequence of relay operation at control office and field stations, respectively, during a control cycle.
Figure 4B:
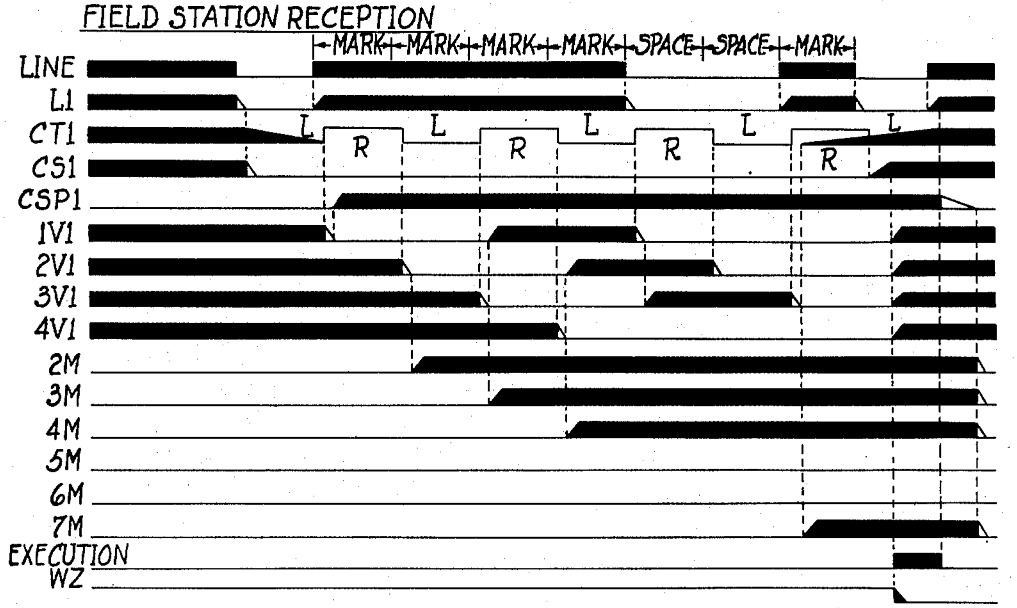

It will be noted with reference to Fig. 4A that during the second excursion of the oscillator pendulum 388 from its initial position, the stepping relay 1V is picked up in response to the dropping away of relay 3V, so that this relay can be used a second time for defining the beginning of a step. Similarly, the dropping away of relay 4V causes the picking up of relay 2V, so that relay 2V can be used again to form an additional step. The dropping away of relay 1V for the second time, during the third excursion of the pendulum 388, causes the picking up of relay 3V, so that this relay can also be used for the second time to form an additional communication channel.

Thus the stepping relays are deenergized successively in numerical order to form the respective steps, the relays 1V, 2V, and 3V being used over for the second time to form a complete complement of seven steps when the following distinctive seven conditions of the stepping relays are established;

| Step No. | Stepping Relay Positions |
|---|---|
| 1 | 1V down—4V up. |
| 2 | 2V down—4V up. |
| 3 | 3V down—4V up. |
| 4 | 4V down—1V up. |
| 5 | 1V down—4V down. |
| 6 | 2V down—4V down. |
| 7 | 3V down—4V down. |

It can thus be said that the respective steps are effectively coded in that they are made up of respective distinctive combinations of front and back stepper relay contacts on four relays in seven different combinations, these combinations being so selected for transmission of the code characters in the control circuit for the code transmitter relay C that seven distinctive communication channels are provided for code transmission. Should a greater number of communication channels be required in practice, the number of steps can be increased by the addition of stepping relays, and the same condition of a repeat of operation for several of the relays can be employed. The selection of the respective code characters for transmission is made through these respective channels, and energy is applied selectively to a mark bus MB or to a space bus SB, the code selected for transmission being in accordance with whichever one of the relays LC that is picked up. For lockout purposes, the first character transmitted from the control office is always a mark, and thus this channel is not used for code communication purposes for this embodiment of the present invention. The manner in which the mark under these conditions is effective to lock out a simultaneous field station start is fully disclosed in the above mentioned Coley application to which reference can be made for a more complete description of the mode of operation under these conditions.

At the field location, the line relay L1 is normally energized, and the deenergization of this relay in accordance with the start of the transmission of a control cycle at the control office is effective to initiate the operation of the code oscillator CT1, and thus initiate the stepping at the field location. This stepping takes place in a manner comparable to the stepping at the control office. Thus the field stepper is not necessarily actuated at the same time as the stepper at the control office. In fact the field stepping is initiated later by the operating time of relay C at the control office and the line relay L1 at the field station, plus whatever line propagation time there may be; but the stepper is actuated at the same rate as the stepper at the control office because of the code oscillators CT at the respective control office and field locations being accurately matched in their operating characteristics so that when they are permitted to operate in free oscillations upon removal of energy from their respective electromagnets, the rate of operation is the same at both the transmitting and receiving stations.

At the field location, a decoding relay M is picked up for each mark that is received during the particular one of the steps with which the relay M is associated, the picking up of this relay being rendered effective in response to the dropping away of the stepping relay for the associated step, provided that the line relay L is picked up at this time. It will be noted with reference to Fig. 1B that there is no relay 1M required because the first character transmitted from the control office is always a mark for lockout purposes as has been heretofor considered, and the lockout condition is satisfied in the control of the relay CSP1 particularly so as not to require a relay M for the reception of this first character. Each relay M when picked up is maintained energized by a suitable stick circuit until the end of the cycle, subsequent to the execution of the code that has been received in a manner fully described in the above mentioned application of N. B. Coley.

Although other types of execution circuit selections may be employed in accordance with the requirements of practice, the embodiment of the present invention illustrated in Fig. 1B provides for an execution circuit affording a parity check of the code so as to eliminate to a large extent the possibility of a reception of a garbled code as being effective to actuate any switch or signal control relay. This parity check system requires communication of codes always having an even number of marks (not including the mark for the first step), and the system for the selection of codes for transmission at the control office is so arranged that each code transmitted comprises an even number of marks (not including the mark for the first step). It is thus provided that should a single mark be lost in the transmission of a code so as not to be received at the field location, the reception of an odd number of marks would prevent execution of a code, and thus there would be no switch or signal control relay actuated as the garbled code would be detected by the parity check system to prevent the execution of a faulty code. Similarly if an additional mark were received by picking up energy on the line circuit from an extraneous source during a single period originally employed for the designation of a space, the reception of one additional mark would prevent the execution of a code at the end of a cycle from being effective to control any switch or signal application relay. It is believed that it should be readily apparent that the system could be readily modified if desired to provide for the codes employed as having odd numbers of marks rather than even numbers, it being a matter of choice as to which form is to be used.

Another condition required to be fulfilled at a field station in order to permit execution is that the line circuit must be deenergized for a short period of time at the time of execution in order that execution can take place. Thus the control office transmitter must open the line circuit for an interval following the transmission of the last character of the code for the cycle of operation in order that the field station may execute the code which has been received and decoded by the selective energization of the mark relays M at the field station.

In view of the foregoing consideration of the requirement for the line circuit to be opened following the code to permit execution, the mode of operation of the check relay CK (see Fig. 1A) at the control office is such that should this relay be dropped away during transmission of a control code because of there being a failure to transmit the designated code, by reason of this relay CK being dropped away during the last part of the cycle, the opening of the line circuit at the end of the cycle to permit execution of the code of the field station is prevented.

From the above described mode of operation, it will be seen that the detection of a garbled transmission at the control office is made by the check relay CK, and the actuation of this relay is effective by preventing the opening of the line circuit at the end of the cycle to transmit a distinctive condition to the field station forestalling execution of the code that has been received, and thus preventing the possibility of a wrong control being executed for the control of a track switch and/or signal. This check will be recognized as being effective for any number of faulty code characters as compared to the parity check which will not detect a double error.

Having thus described the general mode of operation, more specific consideration will hereinafter be given to the circuit organizations involved in providing such mode of operation, reliance being made on the detailed disclosure of the above mentioned application of N. B. Coley for disclosure of the parts of the system that are identical to parts employed according to the present application.

*Initiation of control cycle*

Although it should be readily apparent to those skilled in the art that different systems of initiation of a control cycle which are known in the art may be employed with a system of this character, the system according to the embodiment of the present invention illustrated in Fig. 1A is organized so that no start buttons are required as the relays CH are so governed by polarized circuits as to be actuated whenever the associated switch or signal control lever is moved to a new position. For providing this mode of operation, the respective switch and signal control levers can be considered circuitwise as pole-changing levers in that each time the lever is actuated to a new position, the circuit for the associated change relay CH is pole-changed through its stick contact so as to cause that relay to be dropped away for the initiation of a control cycle, restoration of the relay being effected by energy of the newly selected polarity upon the picking up of the associated relay LC when the cycle is actually initiated.

The relay 4CH, which is associated with the switch control lever 4SML, is normally energized by a stick circuit extending from (+), including front contact 22 of relay 4CH, contact 23 of lever 4SML in its left-hand position, and upper winding of relay 4CH, to (−). Similarly the relay 2–3CH, which is associated with the signal control lever 2–3SGL, is normally energized by a circuit extending from (+), including front contact 24 of relay 2–3CH, contact 25 of lever 2–3SGL in its center position and upper winding of relay 2–3CH, to (−).

If the lever 4SML is moved from its normal to its reverse position (right-hand position), for example, the circuit just described for relay 4CH is pole changed by the shifting of the contact 23 for lever 4SML, and thus the relay 4CH is dropped away upon energization of the lower winding of the relay with the opposite polarity.

Upon the dropping away of the relay 4CH, assuming the system to be at rest, a pickup circuit is closed for relay 4LC extending from (+), including front contact 26 of relay C, back contact 263 of relay CK, back contact 27 of relay LCS, back contact 28 of relay 4CH, and lower winding of relay 4LC, to (−). The picking up of this relay closes a stick circuit for its upper winding including the winding of relay LCS, such circuit extending from (+), including back contact 29 of relay CPP, back contact 30 of relay CP, back contact 31 of relay CSP, front contact 32 of relay CS, front contact 33 of relay L, winding of relay LCS, front contact 34 of relay 4LC, and upper winding of relay 4LC, to (−). The picking up of relay LCS starts the stepping of the cycle by the deenergization of the oscillator CT by opening the circuit by which the oscillator CT is normally energized at back contact 35 (see Fig. 2). The circuit by which the oscillator CT is normally energized extends from (+) including front contact 36 of relay CS, front contact 37 of relay L, back contact 35 of relay LCS, and winding of oscillator CT, to (−).

The relays 4LC and LCS (see Fig. 1A) are maintained energized throughout the control cycle by the stick circuit that has been described, together with other stick circuits wherein front contact 38 of relay CSP, back contact 39 of relay CS, and front contact 40 of relay LCS shunts the front contacts 32 and 33 of relays CS and L, and the back contacts 29, 30, and 31 of relays CPP, CP, and CSP, respectively, out of the stick circuit that has just been described. Another shunting stick circuit is provided by the closure of front contact 41 of relay 1V in series with front contact 40 of relay LCS. The relay 4LC when picked up is effective by the closure of front contact 42 to establish a pickup for the relay 4CH extending from (+), including front contact 43 of relay LCS, front contact 42 of relay 4LC, contact 23 of lever 4SML in its right-hand position, and lower winding of relay 4LC, to (−).

Having thus considered specifically the mode of operation upon initiation of a cycle of operation in accordance with the actuation of the lever 4SML to its right-hand position for designation of the track switch 4W to be operated to its reverse position, it should be readily apparent from the description as set forth that a similar mode of operation is effected upon actuation of the lever 4SML in the opposite direction for the designation of the track switch 4W to be operated to its normal position, the actuation of the lever 4SML in either case being effective to pole change the relay 4CH and thus cause that relay to be dropped away so as to initiate the control cycle.

The initiation of a control cycle for the transmission of a signal control is similarly effected in that the actuation of the three-position signal control lever 2–3SGL to any new position is effective to pole change the associated change relay 2–3CH and thus cause that relay to be dropped away so as to effect the picking up of the relays 2–3LC and LCS. Thus, for example, the actuation of the lever 2–3SGL to its right-hand position for governing the clearing of signal 2 for eastbound traffic pole changes the relay 2–3CH which has been described as having its upper winding normally energized through the contact 25 of the lever 2–3SGL in its center position.

The movement of the lever 2–3SGL in either direction from its center position opens the circuit for the upper winding of the relay 2–3CH at contact 25, and establishes a circuit for the energization of the lower winding with the opposite polarity. Thus, for example, if the lever 2–3SGL is actuated to its right-hand position for designation of a signal to be cleared for eastbound traffic, the lower winding of relay 2–3CH is momentarily energized by a circuit extending from (+), including front contact 24 of relay 2–3CH, contact 25 of lever 2–3SGL in its right-hand position, and lower winding of relay 2–3CH, to (−). This energization is of a polarity to oppose the flux previously set up by energization of the upper winding, and thus the relay 2–3CH is dropped away, and the circuit just described is opened at front contact 24.

Upon the dropping away of relay 2–3CH, if the system is at rest, the relay 2–3LC can be picked up by the energization of a circuit extending from (+), including front contact 26 of relay C, back contact 27 of relay LCS, front contact 28 of relay 4CH, back contact 44 of relay 2–3CH, and lower winding of relay 2–3LC, to (−). Relay 2–3LC, when picked up, causes the picking up of relay LCS by the energization of a circuit extending from (+), including back contacts 29, 30, and 31 of relays CPP, CP, and CSP, respectively, front contact 32 of relay CS, front contact 33 of relay L, winding of relay LCS, front contact 45 of relay 2–3LC, and upper winding of relay 2–3LC, to (−).

After the picking up of the relay LCS in accordance with the picking up of relay 2–3LC, the relay 2–3CH is restored to its picked up position by the energization of a circuit extending from (+), including front contact 43 of relay LCS, front contact 46 of relay 2–3LC, contact 25 of lever 2–3SGL in its right-hand position and lower winding of relay 2–3CH, to (−).

The line circuit comprising the line wires 47 and 48 connecting the control office and the field location is normally energized by a circuit extending from the positive terminal of the line battery LB through back contact 49 of relay CK, front contact 50 of relay CS, winding of relay L, line wire 48, winding of relay L1, front contact 51 of relay C1, and line wire 47, to the negative terminal of the line battery LB.

*Message transmission*

The selection of the code characters used for transmission is in accordance with whichever one of the relays LC (see Fig. 1A) at the control office has been picked up. This is because each of the characters transmitted, except for the first character which is always a mark, is determined by a circuit through a front contact of a relay LC, only one relay LC being picked up at a time in accordance with the chain circuit organization for the picking up of the relays LC as has been heretofore considered. Thus the relay 4LC when picked up, for example is illustrated as having contacts which determine as to whether the respective characters transmitted during a control cycle are marks or spaces in accordance with a predetermined code. If energy is applied through these contacts to a mark bus MB the character transmitted is a mark, and if the character selected for transmission is a space, energy is applied to the space bus SB rather than the mark bus MB. Tthe first group of code characters transmitted is used for identifying the particular device to be controlled according to the present embodiment, and the last group of characters is used for identifying the particular position to which the device selected by the first group of characters is to be operated. Thus the relay 4LC when picked up selects a first group of characters comprising respectively three marks and a space identifying the track switch 4W as the device to be controlled, and the last two characters determine the position to which the track switch 4W is to be operated in accordance with whether the lever 4SM is in its normal or reverse position. Thus the control code for transmission of a reverse control for the track switch 4W comprises the characters "mark-mark-mark-space-space-mark." This is in addition to the first character which is always a mark as has been heretofore described. If the control code to be transmitted is for the operation of the track switch 4W to its normal position, the code selected for transmission by the relay 4LC in combination with the lever 4SML being in its left-hand position is "mark-mark-mark-space-mark-space."

The character transmitted during the first step is always a mark because of the closure of a circuit applying energy to the mark bus MB through contact fingers 52 and 53 of oscillator CT, front contact 54 of relay LCS, front contact 55 of relay 2V, and front contact 56 of relay 4V.

With relay 4LC picked up, the bus MB is energized for the transmission of a mark during the second step through contact fingers 57 and 58 of oscillator CT, front contact 59 of relay LCS, back contact 60 of relay 1V, front contact 61 of relay 3V, front contact 62 of relay 4V, front contact 63 of relay 4LC, and jumper 64.

The character transmitted during the third step is a mark because of energy applied to the bus MB through contact fingers 52 and 53 of oscillator CT, front contact 54 of relay LCS, back contact 55 of relay 2V, front contact 65 of relay 4V, front contact 66 of relay 4LC, and jumper 67.

During the fourth step a mark is transmitted because of energization of bus MB through contact fingers 57 and 58 of oscillator CT, front contact 59 of relay LCS, front contact 60 of relay 1V, back contact 68 of relay 3V, front contact 69 of relay 4LC, and jumper 70.

With relay 4LC picked up, the character transmitted during the fifth step is a space because of the energization of the bus SB through contact fingers 52 and 53 of oscillator CT, front contact 71 of relay LCS, front contact 72 of relay 2V, back contact 73 of relay 4V, front contact 74 of relay 4LC, and jumper 75.

If it is assumed that the lever 4SML has been actuated to its right-hand position for the designation of the track switch 4W to be operated to its reverse position, the character transmitted during the sixth step is a space because of energy applied to the space bus SB through contact fingers 57 and 58 of oscillator CT, front contact 59 of relay LCS, back contact 60 of relay 1V, front contact 61 of relay 3V, back contact 62 of relay 4V, front contact 76 of relay 4LC, and contact 77 of lever 4SML in its right-hand position.

The character transmitted during the seventh step, with the lever 4SML in its right-hand position, is a mark because of application of energy to the bus MB through contact fingers 52 and 53 of oscillator CT, front contact 71 of relay LCS, back contact 72 of relay 2V, back contact 78 of relay 4V, front contact 79 of relay 4LC, and contact 80 of lever 4SML in its right-hand position.

Should a normal switch control be designated for transmission by the actuation of the lever 4SML to its left-hand position, the selected energization of the respective mark and space buses MB and SB would be as has been described except that the last two characters are respectively mark and space as provided by an obvious selection by the contacts 77 and 80, respectively, of the lever 4SML.

In accordance with the application of energy to the mark bus MB, the relay C is picked up by the energization of its lower winding through front contact 81 of relay LCS and front contact 81*a* of relay CK, this relay being dropped away upon the initiation of a control cycle by the opening of its normally energized circuit for its upper winding at back contact 82 of relay LCS. The circuit by which the relay C is normally energized extends from (+), including front contacts 83, 84, 85 and 86 of relays 4V, 3V, 2V, and 1V, respectively, back contact 82 of relay LCS, and upper winding of relay C, to (−). Relay C when energized during any step is maintained energized until the oscillator CT next changes the position of its contacts as its pendulum 338 (see Fig. 2) rotates through center. The actuation of the contacts of the oscillator CT at the end of the first step, for example, opens the circuit for the energization of relay C at contact fingers 52 and 53, and the subsequent dropping away of the relay 2V at the beginning of the second step further opens the circuit for relay C at the front contact 55 to prevent energization during subsequent steps, the inclusion of front contact 56 or relay 4V being effective to maintain the circuit open during the last part of the cycle when the relay 2V is restored to its picked up position and used for a second time during the cycle. Similarily after each of the other steps is taken, the prior circuit for the energization of the relay C is opened and maintained opened for the remainder of the cycle of operation.

Each time that a space is to be transmitted, the space bus SB is energized as has been described, and no energy is applied to the mark bus MB, thus for the corresponding step the relay C is in its dropped away position so as to open the line circuit at front contact 87, the energization of the space bus SB being effective to apply stick energy to the upper winding of relay CK through front contact 88 for purposes to be hereinafter fully described.

Immediately upon the picking up of relay LCS at the beginning of a control cycle, a pickup circuit is closed for the check relay CK extending from (+), including contact fingers 57 and 58 of oscillator CT, front contact 59 of relay LCS, front contact 60 of relay 1V, front contact 68 of relay 3V, and upper winding of relay CK, to (−). The selection of the pickup circuit for the relay CK is such that it is opened as soon as the stepping is initiated, and is maintained open for the remainder of the stepping operation. Thus the continued energization of the relay CK is dependent entirely upon energy applied to its stick circuit, except for slightly slow acting characteristics provided by the shunting of the lower winding of the relay CK through front contact 89. It has been pointed out that the relay CK is energized whenever a space is selected as a code character by application of energy to the space bus SB, and it is also provided that the relay CK has stick energy whenever the relay C is picked up for the transmission of a mark. This energy is applied through front contact 90 of relay C, front contact 91 of relay LCS, and front contact 88 to the upper winding of relay CK.

From the circuits just described for the energization of relay CK, it will be noted that as long as energy is applied selectively to the bus MB or the bus SB for each step during transmission, the stick circuit for the relay CK is maintained substantially continuously energized, the only period of deenergization being the crossover time of a stepping relay contact in going from one step to the next, and the relay CK is maintained picked up for this short interruption of energy by reason of the shunting of its lower winding through the contact 89. It will therefore be seen that the relay CK checks circuit continuity through the respective channels that are used for setting up the respective predetermined codes, and should any contact in this continuity circuit fail to close, a wire becomes loose, or the like, preventing the picking up of the relay C for the transmission of a mark character when such character should be transmitted, there will be no energy applied at the time of transmission of the character to the space bus SB, because it is a mark that has been selected for transmission, and by reason of the relay C failing to pick up, stick energy will be interrupted for the check relay CK at front contact 90 of relay C, and the relay CK will become dropped away for the remainder of the cycle of operation.

Because of the relay CK becoming dropped away during the cycle, it must remain dropped away from the remainder of the cycle, and in accordance with this mode of operation, the relay CK will hold the line circuit closed at the control office through back contact 49 of relay CK, so as to in effect cause all mark characters to be transmitted for the remainder of the cycle, irrespective of the pulsing of contact 87 of relay C in series with the front contacts 92 and 93 of relay LCS. In other words, the back contact 49 of relay CK is arranged in the line circuit to render the selective pulsing of the line circuit ineffective in accordance with the pulsing of the relay C for the remainder of the control cycle. Relay CK is prevented from picking up at the end of the cycle when the stepping relays are restored, because the relay LCS is dropped away prior to the restoration of the stepping relays, and thus the opening of front contact 59 of relay LCS in the pickup circuit for relay CK prevents the picking up of relay CK at the end of a control cycle. Similarly it will be recognized that energy feeding the respective MB and SB buses must also be applied through respective front contacts of relay LCS, and therefore these buses become deenergized upon the dropping away of relay LCS at the end of the cycle. The dropping away of relay LCS, and the associated relay LC, is rendered effective at the end of the control cycle by the picking up of the relay CS to open the stick circuit for relay LCS at back contact 39. The mode of operation of the relay CS in picking up at this time is fully disclosed in the above mentioned prior application of N. B. Coley. With the relay CS picked up, and the relay CK dropped away, the normal conditions of energization are restored for the line circuit.

For the purpose of calling the attention of an operator to the abnormal condition of transmission, the buzzer BZ, or a comparable indicating device, is sounded. Thus if relay CK becomes dropped away during code transmission the buzzer BZ becomes energized by a circuit including back contact 153 of relay C, back contact 154 of relay CK, and front contact 155 of relay LCS. The energization of this circuit is only momentary because of the dropping away of relay LCS and the picking up of relay C at the end of the cycle. If desired, however, stick control requiring the manual acknowledgment of the abnormal condition to open the circuit for the buzzer can be added according to the requirements of practice. For normal operation, the buzzer never sounds at the end of a cycle because relay CK is slow in dropping away and front contact 155 of relay LCS is open before back contact 154 of relay CK becomes closed.

*Reception of controls*

With reference to Fig. 1B, the line relay L1 is indicative during the respective steps of a control cycle as to whether the respective characters received are marks or spaces with reference to stepping by the field stepping relay bank as driven by its associated oscillator CT1. Thus upon reception of the code, a mark relay M is picked up for each step (except the first) in response to the actuation of the corresponding stepping relay, provided that the line relay L1 is picked up at this time to register that a mark is being received over the line circuit.

It is therefore provided that upon the dropping away of the second step relay 2V1, the relay 2M is picked up, provided that the line circuit is energized at this time. The pickup circuit for the relay 2M extends from (+) including back contact 94 of relay LCS1, front contact 95 of relay L1, contact fingers 96 and 97 of oscillator CT1, back contact 98 of relay 1V1, back contact 99 of relay 2V1, front contact 100 of relay 4V1, and lower winding of relay 2M, to (−). The relay 2M when picked up is maintained energized until after the execution period at the end of the cycle by a stick circuit including front contact 101 of relay CSP1, and front contact 102 of relay 2M. The relay CSP1 has been picked up in response to the dropping away of relay 1V1 during the first step by the energization of a circuit extending from (+), including contact fingers 103 and 104 of oscillator CT1, front contact 105 of relay L1, back contact 106 of relay 1V1, front contact 107 of relay 2V1, front contact 108 of relay 4V1, back contact 109 of relay LCS1, and lower winding of relay CSP1, to (−). It will be noted that the relay CSP1 can be picked up by the pickup circuit just described only provided that the front contact 105 of the line relay L1 is closed. This is a requisite for the reception of a control cycle in case of simultaneous control office and field station starts. Relay CSP1, when picked up, is maintained energized for the balance of a control cycle by the energization of one or the other of its several stick circuits as is specifically described in the above mentioned application of N. B. Coley.

Upon the dropping away of the relay 3V1 to mark the beginning of the third time period in the reception of a code at the field location, the relay 3M is picked up, if a mark is received during this time period. The circuit for the energization of relay 3M extends from (+), including back contact 94 of relay LCS1, front contact 95 of relay L1, contact fingers 110 and 111 of oscillator CT1, back contact 112 of relay 2V1, back contact 113 of relay 3V1, front contact 114 of relay 4V1, and lower winding of relay 3M, to (−). The picking up of this relay establishes an obvious stick circuit at front contact 115 to maintain this relay picked up until the end of the cycle.

Upon the dropping away of the relay 4V1 to mark the beginning of the fourth time period in the reception of a code at the field location, the relay 4M is picked up, if a mark is received during this time period. A circuit for the energization of relay 4M extends from (+), including back contact 94 of relay LCS1, front contact 95 of relay L1, contact fingers 96 and 97 of oscillator CT1, front contact 98 of relay 1V1, back contact 116 of relay 4V1, and lower winding of relay 4V1, to (−). The closure of front contact 117 of relay 4M establishes a stick circuit to maintain relay 4M energized for the balance of the control cycle.

If the line circuit is energized at the time when the fifth step is taken, the relay 5M is picked up. The pickup circuit for the relay 5M extends from (+), including back contact 94 of relay LCS1, front contact 95 of relay L1, contact fingers 110 and 111 of oscillator CT1, back contact 118 of relay 1V1, front contact 119 of relay 2V1, back contact 120 of relay 4V1, and winding of relay 5M, to (−). The picking up of this relay closes front contact 121 to maintain the relay 5M picked up until the end of the cycle.

Relay 6M can be picked up during the sixth step, if the line circuit is energized, in accordance with the energization of a circuit extending from (+) including back contact 94 of relay LCS1, front contact 95 of relay L1, contact fingers 96 and 97 of oscillator CT1, back contact 98 of relay 1V1, back contact 99 of relay 2V1, back contact 100 of relay 4V1, front contact 122 of relay 3V1, and lower winding of relay 6M, to (−). The closure of front contact 123 of relay 6M maintains this relay energized for the remainder of the control cycle.

If a mark is received on the seventh step, the relay 7M is picked up upon the dropping away of the relay 3V1 for the second time to form the seventh step. The circuit for the energization of relay 7M extends from (+), including back contact 94 of relay LCS1, front contact 95 of relay L1, contact fingers 110 and 111 of oscillator CT1, back contact 112 of relay 2V1, back contact 113 of relay 3V1, back contact 114 of relay 4V1, and lower winding of relay 7M, to (−). The picking up of this relay establishes a stick circuit at front contact 124 to maintain relay 7M picked up until the end of the execution period.

*Execution*

To consider the execution of a particular code, it will be assumed that the code "mark-mark-mark-space-space-mark" (in addition to the mark transmitted during the first step) has been transmitted for the power operation of the track switch 4W to its reverse position. The reception of this code causes energization as has been described of the decoding relays 2M, 3M, 4M, and 7M. The beginning of the execution period is defined by the picking up of the relay CS1, this relay being picked up in response to the passage of the rotating mechanism of the oscillator CT1 through center for the last time during the cycle of operation. Thus the relay CS1 is picked up at this time by the energization of a circuit extending from (+), including contact fingers 125 and 126 of oscillator CT1, back contact 127 of relay 3V1, back contact 128 of relay 2V1, back contact 129 of relay 1V1, and upper winding of relay CS1, to (−). Relay CS1 when picked up is maintained energized during the execution period by a stick circuit including front contact 130 of relay CSP1, and front contact 131 of relay CS1. This stick circuit maintains the relay CS1 picked up until the relay L1 is picked up at the end of the cycle to close a stick circuit through front contact 132 by which the relay CS1 is normally energized. Relay CSP1 is energized with the relay CS1 picked up through back contact 133 of relay 2V1, front contact 134 of relay CS1, and back contact 109 of relay LCS1. Thus the relay CSP1 and CS1 are maintained picked up until the restoration of the stepping relays to their picked up positions at the end of the cycle so as to open the circuit just described for relay CSP1 at back contact 133 of relay 2V1.

With the relays CSP1 and CS1 both picked up, one of the requisites of an execution period is fulfilled, the other requisite being that the line relay L1 be dropped away. This is in accordance with the general mode of operation that has been described wherein execution of a control code that has been received can be prevented by the abnormal dropping away of the check relay CK at the control office so as to maintain the line circuit closed during the last part of the control cycle and thereby provide that the line relay L1 at the field sttaion is maintained picked up, and is thus effective to prevent execution of the code that has been received by maintaining the execution circuit open at back contact 95.

To consider the specific circuit organization for the execution of a particular control, it will be assumed that the code has been received as has been described for the power operation of the track switch 4W to its reverse position, and with the line relay L1 dropped away and the relays CS1 and CSP1 both picked up, the magnetic stick switch control relay 4WZ is energized with a polarity to drive it to its dropped away position by a circuit extending from (+), including back contact 94 of relay LCS1, back contact 95 of relay L1, front contact 135 of relay CS1, front contact 136 of relay CSP1, back contact 137 of relay CP1, front contacts 138, 139, and 140 of relays 2M, 3M, and 4M, respectively, back contact 141 of relay 5M, back contact 142 of relay 6M, front contact 143 of relay 7M, front contacts 144, 145, and 146 of relays 2M, 3M, and 4M, respectively, back contact 147 of relay 5M, back contact 148 of relay 6M, front contact 149 of relay 7M, front contact 150 of relay 4WZ, and upper winding of relay 4WZ, to (−). The shifting of the contacts 151 and 152 of relay 4WZ pole changes the switch control circuit governing the power operation of the switch machine 4SM and thus causes the power operation of the track switch 4W to its reverse position.

Should the code calling for the power operation of the track switch 4W to its reverse position be received without the short period of deenergization of the line circuit at the time of execution, the line relay L1 would not be dropped away during execution, and the relay 4WZ could not be energized as has been described through back contact 95 of relay L1. Thus receiving the switch control code without the accompanying space at the end of the cycle is indicative of the code being garbled and of its execution being improper.

It will be noted that the protection afforded under the above described conditions for guarding against garbled code transmission is effective where any particular number of characters have been improperly transmitted, while the parity check is effective to detect a garbled code only when the number of characters received is odd as compared to an even number of characters of which the respective control codes are formed. It will be understood that each of these respective means of checking the integrity of the code has its own particular protective feature, the means involving the check relay CK at the control office being effective to give a full check of code transmissions from the office, and the parity check system at the field station being effective to detect to some extent codes which are garbled because of extraneous influences on the line circuit which are not governed from the control office. It is to be understood that although the two different check features herein disclosed cooperate for maximum protection against execution of a faulty code, that each checking means may be used independent of the other if such is the requirement of practice.

Having thus described a code communication system for the control of a typical simple track layout as one embodiment of the present invention, it is desired to be understood that this form is used more particularly to facilitate an understanding of the mode of operation than to limit the scope of the present invention, and it should be readily understood that the code communication system herein disclosed is readily adaptable for use with practically any track layout which may be encountered in practice, and it is to be further understood that various alterations, adaptations, and modifications may be applied to the specific system herein disclosed in accordance with the requirements of practice within the scope of the appending claims.

What I claim is:

1. In a centralized traffic control system for the communication from a control office to a field station of controls for respective controllable devices, normally at rest code communication apparatus connecting the control office and the field station comprising in combination, manually operable means at the control office for designation of a desired control for a particular device, code determining means responsive to the actuation of said manually operable means for determining a particular control code for transmission during a cycle of operation, said code determining means being effective when actuated to initiate the code communication apparatus into a cycle of operation, circuit means effective during code transmission to apply energy to one or the other of two buses, energy being applied to a particular one of the buses whenever a particular type of code character has been determined by said code determining means for transmission, and energy being applied to the other of said buses whenever another type of code character is selected by said code determining means for transmission, a code transmitter relay, circuit means for energizing said code transmitter relay each time energy is applied to said one bus, a check relay, pick up circuit means for said check relay momentarily energized in response to actuation of said manually operable means, stick circuit means for maintaining said check relay energized whenever said code transmitter relay is energized and whenever said other bus is energized, means including said check relay for abnormally conditioning transmission from the control office to the field station at the end of a control cycle when said check relay has been dropped away during code transmission in the associated cycle of operation, decoding means at the field station responsive to the code transmitted from the control office during a cycle of operation, and code execution means at the field station rendered effective at the end of a control cycle of operation to govern said particular device in accordance with the condition of said decoding means, said code execution means being rendered ineffective to govern said particular device at the end of a control cycle when said check relay at the control office has been effective to abnormally condition the code communication apparatus.

2. In a centralized traffic control system for the communication of controls from a control office to a field station for controllable devices, normally at rest code communication apparatus connecting the control office and the field station comprising in combination, manually operable means at the control office for designation of a desired control for a particular device, code determining means responsive to the actuation of said manually operable means for determining a particular control code for transmission, said code determining means being effective when actuated to initiate the code communication apparatus into a cycle of operation, respective mark and space buses energized through contacts of said code determining means in accordance with the determination of the respective code characters for transmission during a control cycle, a code transmitter relay, circuit means for energizing said code transmitter relay each time energy is applied to said mark bus, a check relay, pick up circuit means for said check relay momentarily energized in response to actuation of said manually operable means, stick circuit means for maintaining said check relay energized whenever said transmitter relay is energized and whenever said space bus is energized, means including said check relay for abnormally conditioning transmission at the end of a control cycle during which said check relay has become dropped away during code transmission, decoding means at the field station responsive to the code transmitted from the control office during a cycle of operation, and code execution means at the field station rendered effective at the end of a control cycle to govern said particular device in accordance with the condition of said decoding means, said code execution means being rendered ineffective to govern said particular device at the end of a control cycle when there has been abnormal characterization of transmission at the end of the cycle by reason of the dropping away of said check relay during the transmission of code.

3. In a centralized traffic control system for the communication from a control office of control codes for controllable devices at a field station, normally at rest code communication apparatus including a line circuit connecting the control office and the field station comprising in combination, manually operable means at the control office for designation of a desired control for a particular device, code determining means responsive to the actuation of said manually operable means for determining a particular control code for transmission, said code of selected mark and space characters determining means being effective when actuated to initiate the code communication system into a cycle of operation, circuit means selected by said code determining means for selectively applied energy to respective mark and space buses in correspondence with respective mark and space characters determined by said code determining means for transmission, a code transmitter relay, circuit means for energizing said code transmitter relay each time energy is applied to said mark bus, a check relay, pick up circuit means for said check relay momentarily energized in response to actuation of said manually operable means, stick circuit means for maintaining said check relay energized whenever said code transmitter relay is energized, and whenever a space code character is selected for transmission, means including said check relay for abnormally conditioning said line circuit at the end of transmission of a control code in a control cycle during which said check relay has become deenergized during code transmission, decording means at the field station responsive to the code transmitted from the control office during a cycle of operation, and code execution means at the field station for causing the operation of said particular device in accordance with the respective control code that has been received over said line circuit from the control office, said code execution means being rendered ineffective to govern said device at the end of a control cycle in case said check relay at the control office has abnormally conditioned said line circuit.

4. A centralized traffic control system for the communication from a control office to a field station of respective normal and reverse controls for a two position device comprising in combination, manually operable means at the control office positioned in accordance with designated normal and reverse positions respectively for said device, normally at rest code communication apparatus including a line circuit connecting the control office and the field station, said apparatus having a code transmitter relay at the control office for acting upon said line circuit, a code determining relay at the control office effective when energized in combination with said manually operable means to determine the respective code characters forming respective selected codes for the control of said device, circuit means for energizing said code determining relay in response to the actuation of said manually operable means, circuit means for energizing said code transmitter relay for each character of a particular type selected for transmission by said code determining relay, a check relay at the control office, pick up circuit means for said check relay momentarily energized in response to actuation of said manually operable means, stick circuit means effective to maintain said check relay energized during the transmission of code characters only so long as said trainsmitter relay is energized for each character of said particular type of the code characters determined by said code determining relay and said manually operable means, means including said code communication apparatus and said check relay for abnormally conditioning said line circuit at the end of a control cycle during which said check relay has become deenergized during code transmission, and code execution means at the field station for causing the operation of said device to its respective normal and reverse positions in accordance with the respective normal and reverse switch control codes received over said line circuit, said code execution means being rendered ineffective to govern said device at the end of a control cycle upon the reception at the field station of said abnormal characterization of the line circuit.

5. A centralized traffic control system for the communication from a control office to a field station of controls for a device having a plurality of distinctive controllable conditions comprising in combination, selector means at the control office positioned in accordance with designated respective controllable conditions for said device, normally at rest code communication apparatus connecting the control office and the field station having a code transmitter relay at the conrol office, a code determining relay at the control office effective when energized in combination with said selector means to determine the respective code characters forming respective selected control codes for said device, circuit means for energizing said code determining relay in response to the actuation of said selector means, circuit means for energizing said code transmitter relay for each character of a particular type selected for transmission by said code determining relay, a check relay at the control office, pick up circuit means for said check relay momentarily energized in response to actuation of said manually operable means, stick circuit means effective to maintain said check relay energized during the transmission of code characters only so long as said transmitter relay is energized for each character of said particular type of the code characters determined by said code determining relay, means including said code communication apparatus and said check relay for distinctively characterizing transmission to said field station upon completion of the stepping at the end of a control cycle in case said check relay becomes deenergized during the transmission of a control code in the associated cycle of operation, and code execution means at the field station for causing the operation of said device to its respective controllable conditions in accordance with the respective control codes received, said code execution means being rendered ineffective to govern said device in response to said distinctive characterization of the code communication apparatus.

6. A centralized traffic control system for the communication from a control office to a field station of controls for a device having a plurality of distinctive controllable conditions comprising in combination, manually operable means at the control office for designation of respective desired controllable conditions of said device, normally at rest code communication apparatus connecting the control office and the field station having a code transmitter relay at the control office, a code determining relay at the control office effective when energized in combination with the condition of said manually operable means to determine the respective code characters forming respective selected control codes for said device, circuit means for energizing said code determining relay in response to the actuation of said manually operable means, circuit means for energizing said code transmitter relay for each character of a particular type selected for transmission by said code determining relay and for deenergizing said code transmitter relay for each other type of character to be transmitted, a check relay at the control office, pick up circuit means for said check relay momentarily energized in response to actuation of said manually operable means, stick circuit means effective to maintain said check relay energized during the transmission of code characters only so long as said transmitter relay is actuated in correspondence with the respective types of code characters determined by said code determining relay and said manually operable means, means including said code communication apparatus and said check relay for applying distinctive characterization for transmission to the field station upon completion of the stepping at the end of a control cycle in case said check relay becomes deenergized during code transmission, and decoding means at said field station for causing the operation of said device to its respective controllable conditions in accordance with the respective control codes received, said decoding means being rendered ineffective to govern said device in response to said distinctive characterization of the code communication apparatus.

7. A centralized traffic control system for the communication of controls for a device having a plurality of distinctive controllable conditions from a control office to a field station comprising in combination, a manually operable multiple position selector at the control office for designation of respective controls to be communicated to the field station for said device, a line circuit connecting the control office and the field station, code communication apparatus including a code transmitter relay effective by selective energization to selectively open and close the line circuit for the transmission of selected code characters, a code determining relay at the control office effective when energized in combination with said manually operable selector to determine the respective code characters forming a control code for said device, circuit means for energizing said code determining relay in response to the actuation of said manually operable means, circuit means for energizing said code transmitter relay for each of a particular type of character selected for transmission by said code determining relay and deenergizing said code transmitter relay for each other character, and check circuit means at the control office operable step by step to check continuity through said circuit means for the energization of said code transmitter relay, said check circuit means being effective to distinctively characterize the condition of said line circuit upon completion of the stepping at the end of each control cycle as compared to a normal control cycle whenever said code transmitting relay has failed to transmit a code character corresponding to the code selected by said code determining relay, decoding means at said field station for causing power operation of said device to its respective control conditions in accordance with respective control codes received, said decoding means being rendered ineffective for any control cycle in response to said distinctive characterization of the line circuit at the end of a control cycle, and indicating means at the control office responsive to the actuation of said check circuit means.

References Cited in the file of this patent

UNITED STATES PATENTS

| Number | Name | Date |
|---|---|---|
| 2,409,696 | Lewis | Oct. 22, 1946 |
| 2,452,589 | McWhirter et al. | Nov. 2, 1948 |